United States Patent
Gunnarsson

(10) Patent No.: US 6,860,709 B2
(45) Date of Patent: Mar. 1, 2005

(54) APPARATUS AND METHOD FOR PLACING SPACER STICKS ON A BOARD STACK

(75) Inventor: Jonas Gunnarsson, Buttetorp (SE)

(73) Assignee: C. Gunnarssons Verkstads AB, Vislanda (SE)

( * ) Notice: Subject to any disclaimer, the term of this patent is extended or adjusted under 35 U.S.C. 154(b) by 37 days.

(21) Appl. No.: 10/168,857

(22) PCT Filed: Dec. 13, 2000

(86) PCT No.: PCT/SE00/02514
§ 371 (c)(1),
(2), (4) Date: Jun. 26, 2002

(87) PCT Pub. No.: WO01/47794
PCT Pub. Date: Jul. 5, 2001

(65) Prior Publication Data
US 2003/0002974 A1 Jan. 2, 2003

(30) Foreign Application Priority Data
Dec. 27, 1999 (SE) ............................... 9904788

(51) Int. Cl.⁷ ............................................. B65G 57/03
(52) U.S. Cl. ............................ 414/793.4; 414/789.5; 414/794.2
(58) Field of Search ......................... 414/789.5, 793.4, 414/793.5, 794.2, 793.7, 794.4

(56) References Cited

U.S. PATENT DOCUMENTS

| | | | |
|---|---|---|---|
| 3,738,510 A | | 6/1973 | Mason |
| 4,058,430 A | | 11/1977 | Suntola et al. |
| 4,144,976 A | * | 3/1979 | Rysti ..................... 414/789.5 |
| 4,360,303 A | * | 11/1982 | Rysti ..................... 414/789.5 |
| 4,801,233 A | * | 1/1989 | Ritola .................... 414/789.5 |
| 4,878,803 A | * | 11/1989 | Whiddon ................ 414/789.5 |
| 5,263,812 A | * | 11/1993 | Bowlin .................. 414/789.5 |
| 5,350,272 A | * | 9/1994 | Bowlin .................. 414/789.5 |
| 5,580,212 A | * | 12/1996 | Andersson et al. ...... 414/789.5 |
| 5,636,965 A | * | 6/1997 | Newnes et al. ......... 414/789.5 |
| 6,007,295 A | * | 12/1999 | Sears et al. ............ 414/789.5 |
| 6,065,927 A | * | 5/2000 | Baron et al. ........... 414/789.5 |

FOREIGN PATENT DOCUMENTS

| | | |
|---|---|---|
| SE | 407022 | 3/1979 |
| SE | 393967 | 5/1997 |

* cited by examiner

Primary Examiner—Richard Ridley
(74) Attorney, Agent, or Firm—Smith, Gambrell & Russell

(57) ABSTRACT

An apparatus for placing out spacer sticks on a board stack (1) comprises a feeder device (5) for the individual discharge of spacer sticks (3). The feeder device (5) is placed in association with one short end of the stack (1). Further, the apparatus has a conveyor device which is located above the stack (1) for conveying spacer sticks (3) from the feeder device (5) to positions over the stack (1). At least those parts of the conveyor device which are located under the spacer sticks (3) are disposed to be movable in the lateral direction between advancement positions over the stack (1) and release positions outside the stack. As a result, the spacer sticks (3) are movable from position over the stack (1) to positions where they rest on the stack (1). A method for placing spacer sticks on a board stack is also disclosed.

34 Claims, 4 Drawing Sheets

APPARATUS AND METHOD FOR PLACING SPACER STICKS ON A BOARD STACK

TECHNICAL FIELD

The present invention relates to an apparatus for placing spacer sticks (also known as dunnage) on a board stack, and comprising a feeder device For the individual feeding of spacer sticks, the feeder device being placed in association with one short end of the stack, and a conveyor device located over the stack for conveying spacer sticks from the feeder device to positions over the stack.

The present invention also relates to a method for placing spacer sticks on a board stack, comprising the steps that the spacer sticks are discharged individually from a feeder device to a conveyor device, that the spacer sticks are carried by at least one carrier device located beneath the spacer sticks along a path over the stack and that the spacer sticks, when they are brought to positions substantially straight above their intended positions on the stack, are transferred to them.

BACKGROUND ART

In the stacking of boards, a whole layer of boards is laid on the top of a board stack which is under construction by means of an off-loader which moves transversely of the longitudinal direction of the boards to a position in over the board stack. There, the layer of boards is off-loaded on subjacent spacer sticks whose longitudinal directions are transversely directed in relation to the longitudinal direction of the boards. Thus, the off-loader is placed along one longitudinal side of the board stack which is being constructed.

The board stack which is being built up is placed on a vertically adjustable substrate which is gradually lowered as the height of the board stack increases so that the level of the uppermost layer in the board stack is thereby throughout substantially unchanged.

For placing spacer sticks on the upper side of a recently off-loaded layer of boards, use is normally made of two chains which run in over the stack and in its longitudinal direction, and in parallel with one another, and at such a height over the stack that the off-loader can pass under them for off-loading a layer of boards. The chains have hooks which, on the lower parts of the chains, are rearwardly open in the direction of travel. The chains are employed for conveying spacer sticks from a feeder device to positions over the stack. By the employment of vertically movable abutments, the spacer sticks are caused to release from the hooks and fall down on the upper side of the stack.

A spacer stick layer device of this type comprises a considerable quantity of complex mechanical machinery. The distances between adjacent spacer sticks cannot readily be changed, and nor can spacer sticks of varying dimensions be handled. Finally, the work rate is too low.

For laying out spacer sticks, an apparatus is further known in the art by means of which the spacer sticks are placed out on a substrate on the opposite side of the board stack in relation to the off-loader and from thence are lifted and displaced by means of suitable gripping members in over the board stack where the spacer sticks are lowered and deposited on the board stack.

An apparatus of this type operates slowly because of the long transport distances which are required on laying out the spacer sticks. Further, it is difficult to get at the finished stack, since it is surrounded by machinery.

PROBLEM STRUCTURE

The present invention has for its object to design the apparatus and the method intimated by way of introduction such that at least the one longitudinal side of a board stack can be kept wholly fee of machinery so that the board stack is thereby readily accessible. Further, the present invention has for its object to design the apparatus such that this may work at a very high work rate and with good operational reliability, and also permit convenient modification of the number, mutual spacing and dimensions of the spacer sticks.

SOLUTION

The objects forming the basis of the present invention will be attained regarding the apparatus if this is characterized in that at least parts of the conveyor device located beneath the spacer sticks are disposed to be movable in the lateral direction from advancement positions over the stack to release positions outside the stack, whereby the spacer sticks may readily be transferred from their positions located over the stack to positions where they rest on the stack.

Furthermore, the objects forming the basis of the present invention will be attained regarding the method if this is characterised in that the spacer sticks are moved along and in the longitudinal direction of the carrier device and, when they have reached their positions above the intended positions on the stack, are stopped and the carrier device is released from the spacer sticks which are transferred to their intended positions.

BRIEF DESCRIPTION OF THE ACCOMPANYING DRAWINGS

The present invention will now be described in greater detail hereinbelow, with particular reference to the accompanying Drawings. In the accompanying Drawings.

DESCRIPTION OF PREFERRED EMBODIMENT

The accompanying Drawings show only those components which directly carry out the laying-out of the spacer sticks on the upper side of the board stack. Thus, the Drawings have omitted the beam frame which supports the above-mentioned components, as well as the guides and drive means required for their movements.

Figure 1:
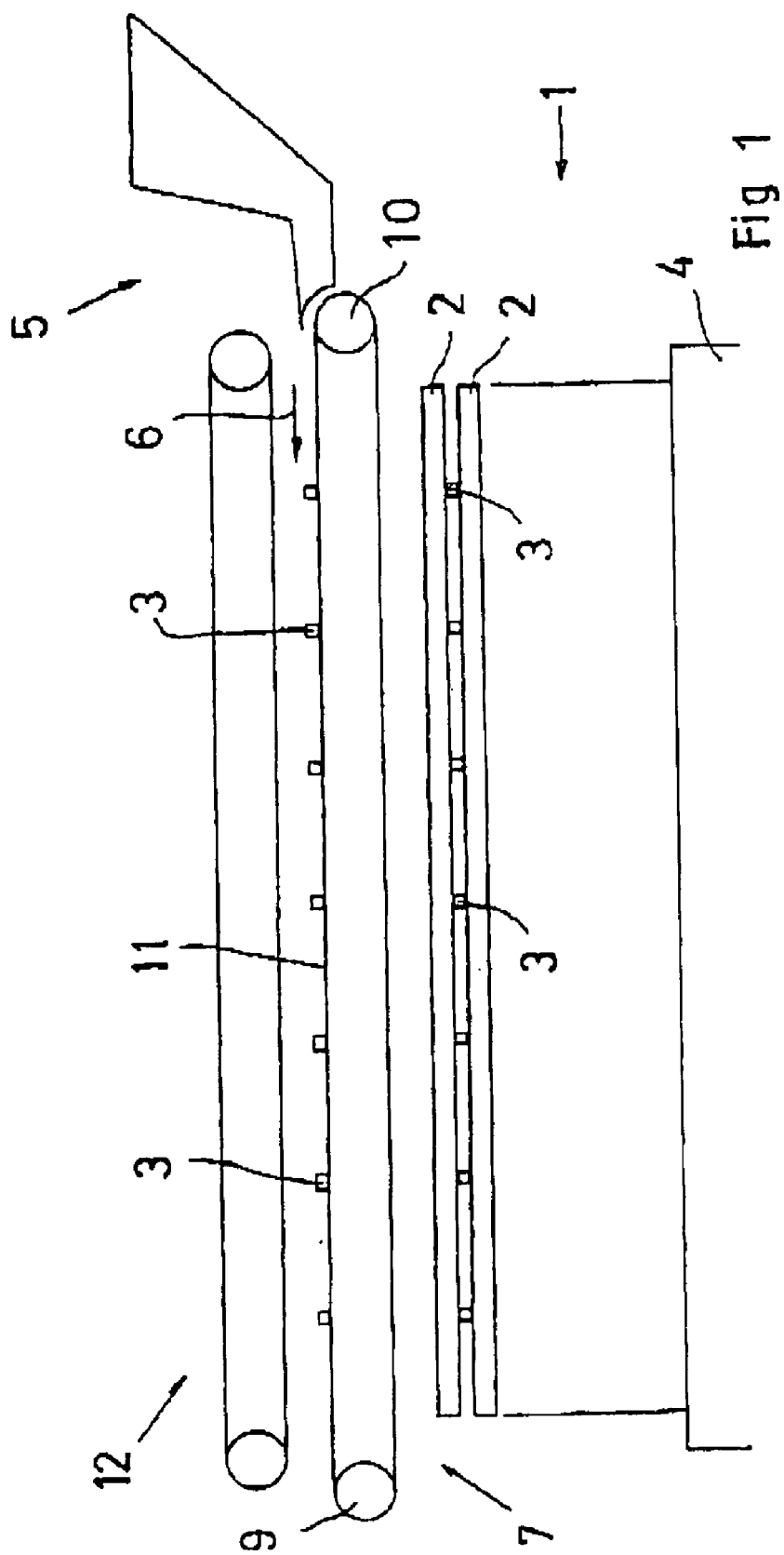
FIG. 1 is a schematic, greatly simplified vertical side elevation of the apparatus according to the present invention.

In FIG. 1, reference numeral 1 relates to a board stack which is in the process of being built up from boards 2 which are arranged in layers and a number of spacer sticks 3 are located between the layers. The board stack 1 rests on a substrate 4 which is movable in the vertical direction and which is gradually lowered as the board stack 1 is built up so that the uppermost layer of boards 2 is kept at a substantially constant level.

Figure 2:
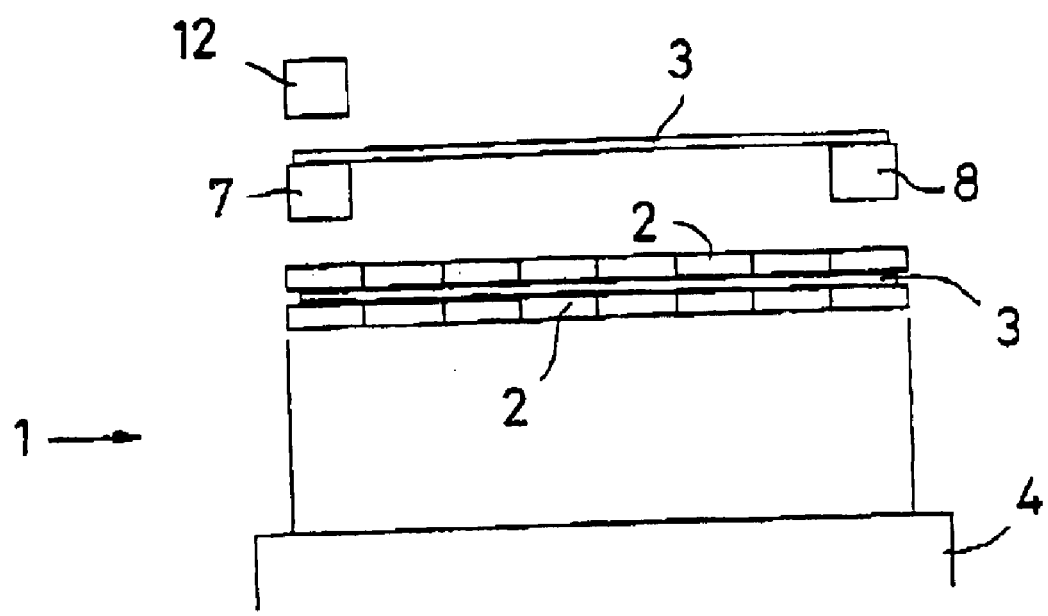
FIG. 2 is a simplified end elevation of the apparatus according to the present invention in a first working step during the laying-out of the spacer sticks.

The boards 2 are displaced by layers in over the board stack by means of an off-loader (not shown) and are off-loaded on spacer sticks placed there. In FIG. 2, this takes place from the right.

In connection with the one short end of the board stack 1, there is disposed a feeder device 5 whose feeding direction is intimated by the arrow 6, the spacer sticks being fed out individually and with their longitudinal direction horizontal and transversely directed in relation to the feeding direction 6.

In its most generic form, the present invention entails that there are disposed, in over the stack 1 and substantially parallel with its longitudinal direction, elongate carrier devices which are included in a conveyor device and which, with their one end, extend to the feeder device 5 and which, with their opposite end, extend at least so far along the stack 1 where spacer sticks 3 are to be placed. The carrier devices have no fixed positions for the spacer sticks 3, but these can be transported carried by and along the carrier devices in basically any optional number and with any optional spacing. The transport speed along the carrier devices for the spacer sticks 3 is the same for all of the spacer sticks which are to lie in the same layer on the stack 1, but may otherwise be varied within broad limits.

Alternatives are also conceivable where only one carrier device is employed along either of the longitudinal sides of the stack 1. In order to prevent the end portions of the spacer sticks 3 not carried by the carrier device from falling down on the stack, there is provided, over the stack, an elongate hold-down device, for example a belt or chain conveyor or slide rail so that the spacer sticks are fixedly clamped between the carrier device and the hold-down device when they are moved along the carrier device with their longitudinal direction transversely directed, preferably approximately at right angles, to the longitudinal direction of the carrier device.

When the number of spacer sticks 3 which are to be located on the uppermost board layer of the stack 1 has been transported along the carrier device/devices to positions straight above the positions they are to assume on the stack 1, the movement of all of the spacer sticks is arrested simultaneously, whereafter the spacer sticks are transferred downwards, preferably by force of gravity, to their final positions on the stack.

In one alternative, the vertical transfer of the spacer sticks 3 to their final positions on the stack 1 is made possible in that the two carrier devices are displaced horizontally sideways from the feeding/transport positions in over the stack 1 to release positions outside the stack, whereby the spacer sticks 3 can pass down between the carrier devices. On the lateral movement of the carrier devices, the spacer sticks are held so that they cannot be displaced in their longitudinal direction (accompany either or both of the carrier devices).

As an alternative to the substantially horizontal lateral displacement of the carrier devices away from one another, it is also possible to turn the spacer sticks 3 a certain angle in a substantially horizontal plane so that the opposite ends of the spacer sticks are free from the mutually facing edges of the carrier devices, whereafter the spacer sticks are lowered to a level below the carrier devices, they then being turned back through approximately the same angle before they are released down on the stack In the alternative with only one carrier device, the carrier device and the hold-down device are separated from one another in the vertical direction so that the ungripped ends of the spacer sticks rock down on the stack 1. In this position, the spacer sticks are fixed in their longitudinal direction, whereafter the carrier device is laterally displaced to the release position so that the spacer sticks can fall completely down on the stack Concrete embodiments of the present invention will now be described with reference to the accompanying Drawings.

Above the board stack 1, there is disposed a conveyor device with two conveyors 7 and 8 which extend approximately parallel with the longitudinal sides of the stack 1 in over the stack 1. The conveyors serve the function of carrier devices and are suitably designed as belt conveyors where the conveyor belts have layers facing towards the spacer sticks 3 which, on the one hand, afford high friction against the spacer sticks and which, on the other hand, are somewhat resiliently yieldable so that the spacer sticks can be pressed slightly therein if the spacer sticks are pressed against the conveyors 7 and 8. The conveyor 7 has a belt 11 running over two rollers 9 and 10. The conveyor 8 has a corresponding construction. The two conveyors 7 and 8 run with synchronous speed and can, therefore, receive spacer sticks discharged from the feeder device 5, the spacer sticks being transported with retained orientation in the direction of the arrow 6 along the two conveyor. The and surfaces of spacer sticks placed on the conveyors are shown in FIG. 1.

The distance between the spacer sticks resting on the conveyors may readily be modified by a modification of the relationship between the linear speed of advancement of the conveyors and the discharge rate of the individual spacer sticks out of the feeder device 5.

Figure 3:
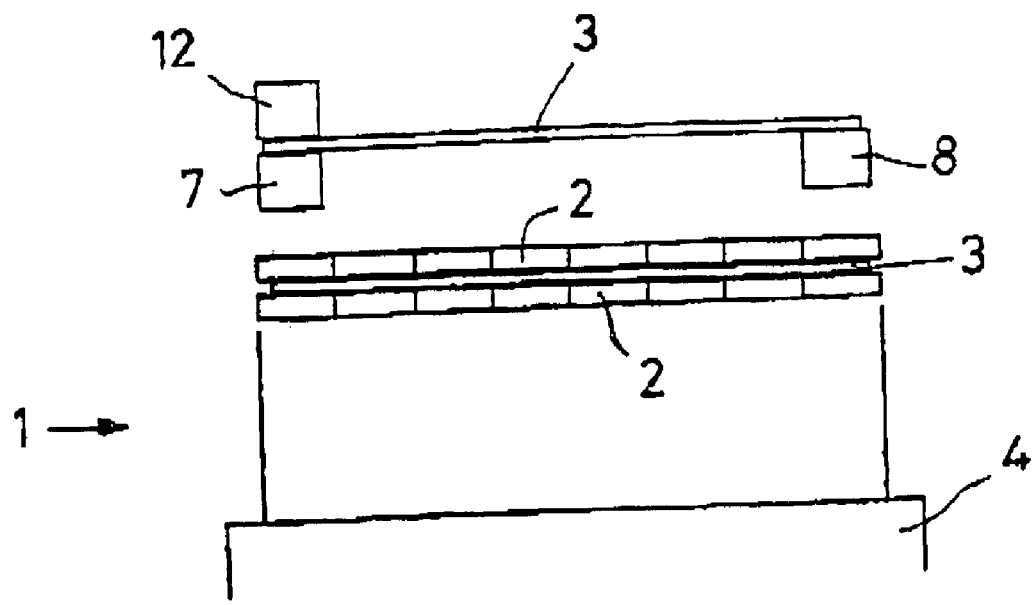
FIG. 3 is a view corresponding to that of FIG. 2 in a later working step in the laying-out of the spacer sticks.
Figure 6:
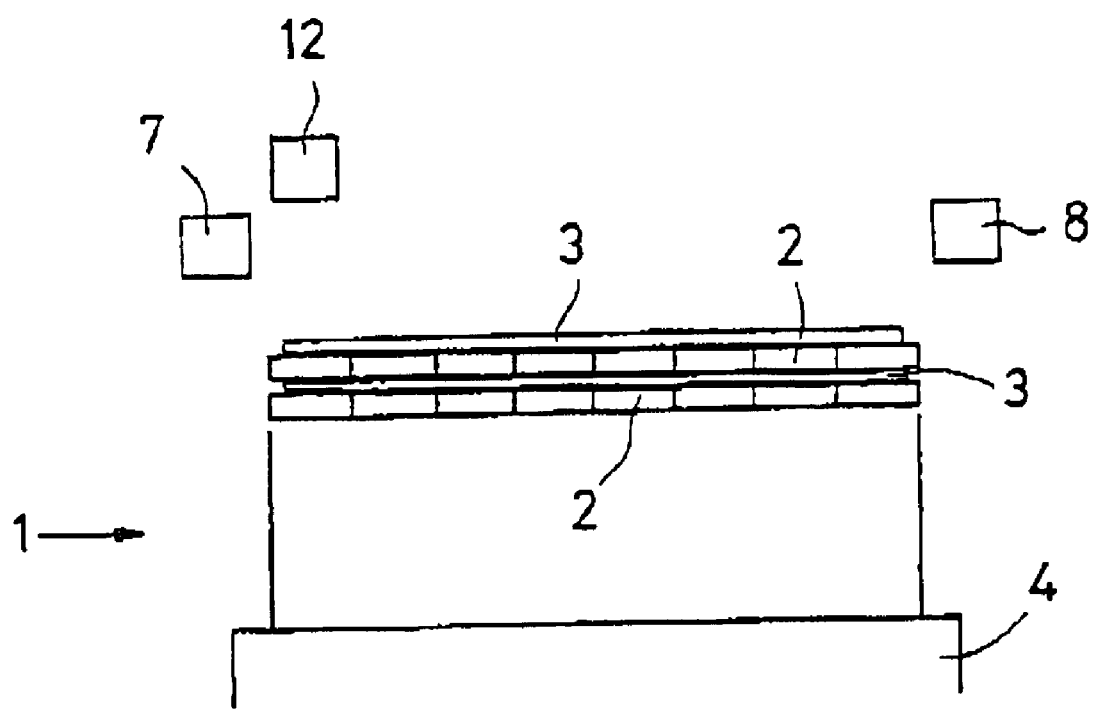
FIG. 6 is a view corresponding to that of FIG. 2 showing the apparatus when the spacer sticks have been placed on the upper side of the stack.

The two conveyors 7 and 8 are movably secured in a frame (not shown on the Drawings) for the apparatus according to the invention and are at least movable laterally in a substantially horizontal direction between the advancement positions illustrated in FIGS. 2 and 3 and the release positions illustrated in FIG. 6. In the advancement positions, the conveyors are, as is apparent from FIGS. 2 and 3, disposed in over the upper side of the stack and approximately along and slightly inside opposing edges of the stack. In the release positions, the conveyors 7 and 8 are located completely outside the stack seen in the lateral direction.

The transfer of the conveyors 7 and 8 between the advancement positions and the release positions and back may be realised by employing linear guides and piston and cylinder units, but may also be realised in that the conveyors are pendulum-suspended and are laterally moved in a pendulum motion.

In the embodiment shown on the Drawings, the hold-down devices are designed as a third conveyor 12 which is placed parallel with and a slight distance above one of the conveyors 7 and 8 when these are located in the advancement position. The third conveyor 12 is movable in the vertical direction and, as is apparent from FIGS. 2 and 3, displaceable into abutment against the spacer sticks 3 resting on the conveyors 7 and 8.

Figure 4:
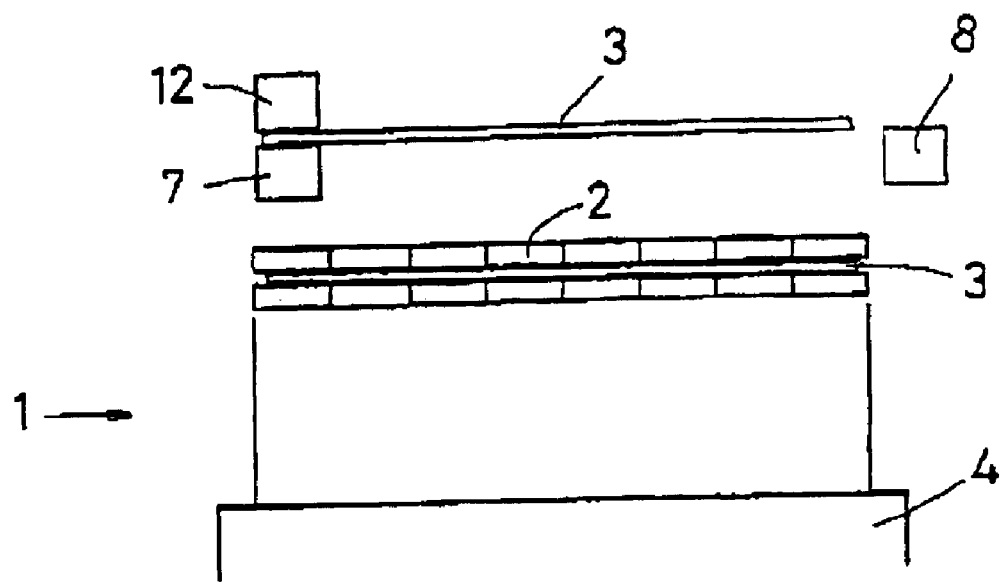
FIG. 4 is a view corresponding to that of FIG. 2, a further working step having been completed in the laying-our of the spacer sticks.

When the different conveyors 7, 8 and 12 are in the positions illustrated in FIG. 3, the conveyor 8 is laterally displaced to the position according to FIG. 4, the spacer sticks being fixedly clamped between the conveyors 7 and 12 so that they freely hang out from these two conveyors.

When the third conveyor 12 is lifted back to the starting position, the spacer stick 3 will rock and pivot so that its right-hand end in the Figures falls down on the uppermost layer of boards 2 in the board stack 1 and rests on it. In the last step of the deposition of the spacer sticks, the conveyor 7 is laterally displaced to the position illustrated in FIG. 6 so that the opposite ends of the spacer stacks 3 also fall down on the upper side of the stack 1.

In order to ensure that the spacer sticks 3 do not accompany the lateral displacement when the conveyor 7 is moved, it is possible to provide, in the region at reference numeral 13, a longitudinal rail which has a smooth upper side and which extends along the entire length of the upper part of the conveyor 7 and is placed, in the vertical direction, in such a manner that, with the spacer sticks 3 horizontal, it has a shorter distance to the undersides of the spacer sticks while it abuts against and slightly lifts the spacer sticks 3 from the conveyor 7 when the opposite ends of the spacer sticks have fallen or been pivoted down on the upper side of the stack 1 and both the conveyor 7 and the rail 13 are laterally displaced to the release position. In that the rail 13 has slight friction against the spacer sticks 3 (which, on the other hand, is not the case for the belt of the conveyor 7), the risk is reduced that the spacer sticks might possibly be entrained in the lateral movement.

Figure 5:
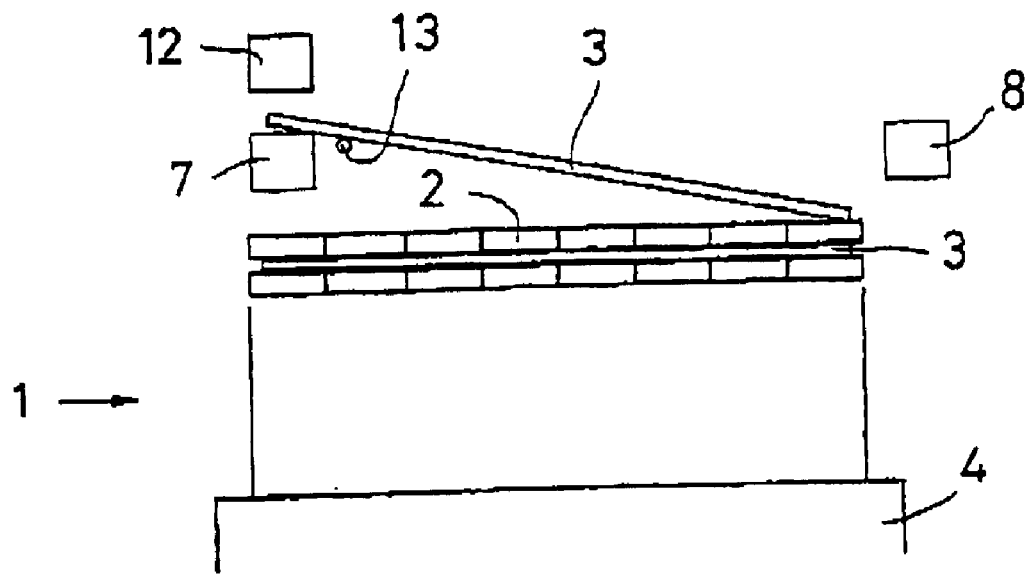
FIG. 5 is a view corresponding to that of FIG. 2, yet a further working step having been completed in the laying-out of the spacer sticks.

In another alternative, the conveyor 8 is also movable in the vertical direction so that, in the position according to FIG. 5, it may be shifted in to its starting position and there be lowered so that it is applied against the lower ends of the spacer sticks 3 so that these are clamped between the conveyor 8 and the upper side of the board stack 1.

On the infeed of the spacer sticks on the conveyors 7 and 8, it has been shown in the Figures that the third conveyor 12 is to be located in its raised position. However, this is not necessary, but the conveyor 12 may be driven synchronously with the two other conveyors so that the spacer sticks 3 are thereby fixedly clamped between the conveyor belts in the conveyors 7 and 12. Hereby, the work rate will be substantially increased and, further, the risk will be avoided that the spacer sticks lose their positioning when the conveyors are stopped when the spacer sticks carried on the conveyors are located straight above their intended positions an the upper side of the stack 1.

According to the present invention, it is also possible to employ a fourth conveyor which corresponds to the third conveyor 12 and which is placed over the conveyor 8. This fourth conveyor also improves the positioning of the spacer sticks by clamping the spacer sticks between itself and the subjacent conveyor 8 in connection with acceleration or retardation movements of the conveyors.

If a fourth conveyor is employed, its movement space in the vertical direction may be so great that it can be applied against the lower end of inclined spacer sticks according to FIG. 5 when the conveyor 8 is laterally displaced to its release position.

The hold-down device need not be designed as the third conveyor 12 or possibly the fourth conveyor, but may, in an alternative version, be in the form of an elongate rail which is movable in the vertical direction and placed analogous with the conveyor 12 so that it may be applied against the upper sides of the spacer sticks 3 carried on the conveyors 7 and 8 when these are located in positions according to FIGS. 3 and 4.

Correspondingly, a vertically displaceable rail can replace the clamping function which may be allocated to the conveyor 8 in the position according to FIG. 5.

In a further alternative, the hold-down device nay be designed as elongate stop bars which are placed in connection with the end surfaces of the spacer sticks 3 in such vertical positions that the carrier devices can pass under them on the displacement from the advancement position to the release position, but be sufficiently low for them to be struck by the spacer sticks 3 if these were to be displaced in the longitudinal direction.

It is also possible to form the hold-down device so that it can impart a limited longitudinal movement to the spacer sticks 3. As a result, in such embodiments where the spacer sticks 3 rest on two carrier devices, e.g. the two conveyors 7 and 8, one of these may be made fixed in the lateral direction since the spacer sticks instead are longitudinally displaced so far that their ends are free of this field carrier device.

In the foregoing, it has been described how the carrier devices are designed as conveyors on which the spacer sticks 3 rest. An alternative carrier device is an elongate slide rail which, on its side facing towards the spacer sticks, has a coating consisting of a material of low friction in relation to the spacer sticks. For driving the spacer sticks along the slide rails, use is made of one or two conveyors (e.g. the conveyor 12 above) placed over the spacer sticks 3 and clamping the spacer sticks between itself and the subjacent slide rail. Both the slide rail and the co-operating conveyor may be movable in the vertical direction for releasing the spacer sticks 3.

A construction in which the conveyors are placed undermost and thus function as carrier devices and in which the slide rails are placed uppermost is also possible.

In the foregoing, it has been described how the spacer sticks 3 are carried by carrier devices in the form of slide rails or conveyors 7 and 8 at opposite end portions. However, it is also possible to employ a single career device which may be placed at one end of the spacer sticks or in the central region of the spacer sticks.

When the carrier device (conveyor or slide rail) is placed at end portions of the spacer sticks, it must be combined with a hold-down device (slide rail or conveyor, respectively) so that the operational conditions will be as shown in FIG. 4 and the laying-out of the spacer sticks as shown in FIG. 5.

When the carrier device is placed under the central region of the spacer sticks, the carrier device may be made so wide that a hold-down device may possibly be dispensed with.

What is claimed is:

1. An apparatus for placing a selectable number of spacer sticks with selectable mutual distance on top of a board stack having first and second longitudinal sides and first seconds ends, the apparatus comprising:
   a feeder device for individually feeding spacer sticks with a selectable rate of feeding, the feeder device being located in association with the first end of the board stack;
   a conveyor device provided above the board stack and configured to receive the spacer sticks as fed by the feeder device and to transport them with a selectable speed of transportation to locations above their intended locations on the board stack; the conveyor device having at least one first and one second conveyor, each having upper and lower runs, the first and second conveyors being, in transport positions, located above the board stack and along opposite longitudinal sides thereof for supporting, on their upper runs, opposite end portions of the spacer sticks, the first and second conveyors being laterally displaceable apart to release positions where the spacer sticks are free to pass downwardly between them to their intended positions on top of the board stack.

2. The apparatus as claimed in claim 1, wherein the second conveyor is movable in a vertical direction and into abutment against lower end portions of the spacer sticks which, with the lower end portions, rest on the stack and which, with the upper end portions, rest on the first conveyor.

3. The apparatus as claimed in claim 1, wherein hold down members in the form of belt conveyors are provided at both the first and at the second conveyors.

4. The apparatus as claimed in claim 1, wherein one of the first and second conveyors and an elongate slide wall are disposed to grip between them and advance the spacer sticks, the conveyor and the elongate slide having longitudinal directions which are substantially parallel with one another and with the longitudinal direction of the stack, and being disposed over the stack and along one longitudinal edge thereof.

5. The apparatus as claimed in claim 1, wherein at least one of the first and second conveyors is a belt conveyor having a material layer facing towards the spacer sticks which is resiliently yieldable and relatively soft in order to permit the spacer sticks, during advancement, to be at least partly impressed therein.

6. The apparatus as claimed in claim 1, wherein two elongated stop bars are provided in connection with opposite end surfaces of the spacer sticks when the spacer sticks rest on the first and second conveyors, the stop bars being located, in the vertical direction, so as to permit passage, beneath the stop bars, of the conveyors when the conveyors are laterally displaced to their release positions, but to be hit by the end surfaces of the spacer sticks if one or more of the spacer sticks were to accompany such lateral movement.

7. The apparatus as claimed in claim 1, wherein an elongated slide rail is provided over the board stack and substantially in parallel with the first conveyor when in transport position, said slide rail being located vertically such that, when the second conveyor has been displaced to its release position and the second end portions of the spacer sticks originally supported on the second conveyor have fallen down onto the board stack, the first end portions of the spacer sticks are supported on the slide rail instead of on the first conveyor, said slide rail being laterally displaceable together with the first conveyor.

8. The apparatus as claimed in claim 7, wherein the elongated slide rail has a surface facing towards the spacer sticks which is of low friction vis-à-vis the spacer sticks.

9. The apparatus as claimed in claim 1, wherein a hold down member is provided to prevent longitudinal displacement of the spacer sticks when at least one of the first and second conveyors are laterally displaced to its release position.

10. The apparatus as claimed in claim 9, wherein the hold down member is a belt conveyor.

11. The apparatus as claimed in claim 9, wherein the hold down device is in the form of an elongate rail.

12. The apparatus as claimed in claim 9, wherein the hold down device is in the form of an elongate rail which is. substantially parallel with the conveyors and which is movable in the vertical direction and into abutment from above against end portions of the spacer stick facing away from the conveyors.

13. An apparatus for placing spacer sticks on top of a board stack, comprising:
a feeder device for individually feeding spacer sticks, the feeder device being located at an end of the board stack;
a conveyor device configured to receive the spacer sticks as fed by the feeder device and to transport the spacer sticks to locations above their intended locations on top of the board stack; the conveyor device having at least one first and one second conveyor, the conveyors being located, in transport positions, above the board stack and along its opposed longitudinal sides for supporting opposite end portions of the spacer sticks, the first and second conveyors being laterally displaceable apart to release positions where the spacer sticks may pass between said first and second conveyors to the spacer sticks intended positions on top of the board stack.

14. The apparatus as claimed in claim 13, wherein a hold down member is provided to prevent longitudinal displacement of the spacer sticks when at least one of the first and second conveyors are laterally displaced to its release position.

15. The apparatus as claimed in claim 13, wherein two elongated stop bars are provided in connection with opposite end surfaces of the spacer sticks when the spacer sticks rest on the first and second conveyors, the stop bars being located, in the vertical direction, so as to permit passage, beneath the stop bars, of the conveyors when the conveyors are laterally displaced to their release positions, but to be hit by the end surfaces of the spacer sticks if one or more of the spacer sticks were to accompany such lateral movement.

16. The apparatus claimed in claim 13, wherein an elongated slide rail is provided over the board stack and substantially in parallel with the first conveyor when in transport position, said slide rail being located vertically such that, when the second conveyor has been displaced to its release position and the second end portions of the spacer sticks originally supported on the second conveyor have fallen down onto the board stack, the first end portions of the spacer sticks are supported on the slide rail instead of on the first conveyor, said slide rail being laterally displaceable together with the first conveyor.

17. An apparatus for placing spacer sticks on top of a board stack comprising:
a feeder device for individually feeding spacer sticks, the feeder device being located at an end of the board stack;
a conveyor device configured to receive the spacer sticks as fed by the feeder device and to transport the spacer sticks to locations above their intended locations on top of the board stack; the conveyor device having at least one lower and one upper conveyor located, in transport positions, above the board stack and along one longitudinal side of the board stack for nipping end positions of the spacer sticks as fed by the feeder device between the lower and upper conveyors, said upper conveyor being displaceable upwardly to a release position and said lower conveyor being displaceable laterally away from the board stack to a release position where the end portions of the spacer sticks are free to fall down onto the board stack.

18. The apparatus as claimed in claim 17, wherein a hold down member is provided to prevent longitudinal displacement of the spacer sticks when the lower conveyor is laterally displaced to its release position.

19. The apparatus as claimed in claim 17, wherein two elongated stop bars are provided in connection with opposite end surfaces of the spacer sticks when the spacer sticks rest on the lower conveyor, the stop bars being located, in the vertical direction, so as to permit passage, beneath the stop bars, of the conveyor when the conveyors are laterally displaced to their release positions, but to be hit by the end surfaces of the spacer sticks if one or more of the spacer sticks were to accompany such lateral movement.

20. An apparatus for placing spacer sticks on top of a board stack comprising:
a feeder device for individually feeding spacer sticks, the feeder device being located at an end of the board stack;

a conveyor device configured to receive the spacer sticks as fed by the feeder device and to transport the spacer sticks to locations above their intended locations on top of the board stack; the conveyor device having at least one first and one second conveyor, the conveyors being located, in transport positions, above the board stack and along its opposed longitudinal sides for supporting opposite end portions of the spacer sticks, the first and second conveyors being laterally displaceable apart to release positions where the spacer sticks may pass between said first and second conveyors to their intended positions on the top of the board stack; and an elongated hold down member extending above and along the first conveyor in the transport position thereof, said hold down member having a lower position in which end portions of the spacer sticks are clamped between the hold down member and the first conveyor and an elevated position where the end portions of the spacer sticks are free of the hold down member.

21. The apparatus as claimed in claim 20, wherein said hold down member prevents longitudinal displacement of the spacer sticks when at least one of the first and second conveyors are laterally displaced to its release position.

22. The apparatus as claimed in claim 20, wherein two elongated stop bars are provided in connection with opposite end surfaces of the spacer sticks when the spacer sticks rest on the first and second conveyors, the stop bars being located, in the vertical direction, so as to permit passage, beneath the stop bars, of the conveyors when the conveyors are laterally displaced to their release positions, but to be hit by the end surfaces of the spacer sticks if one or more of the spacer sticks were to accompany such lateral movement.

23. The apparatus as claimed in claim 20, wherein an elongated slide rail is provided over the board stack and substantially in parallel with the first conveyor when in transport position, said slide rail being located vertically such that, when the second conveyor has been displaced to its release position and the second end portions of the spacer sticks originally supported on the second conveyor have fallen down onto the board stack, the first end portions of the spacer sticks are supported on the slide rail instead of on the first conveyor, said slide rail being laterally displaceable together with the first conveyor.

24. An apparatus for placing spacer sticks on top of a board stack comprising:
a feeder device for individually feeding spacer sticks, the feeder device being located at an end of the board stack;
a conveyor device configured to receive the spacer sticks as fed by the feeder device and to transport the spacer sticks to locations above their intended locations on top of the board stack; the conveyor device having at least one first and one second conveyor, the conveyors being located, in transport positions, above the board stack and along its opposed longitudinal side for supporting opposite end positions of the spacer sticks, the first and second conveyors being laterally displaceable apart to release positions where the spacer sticks may pass between said first and second conveyors to their intended positions on top of the board stack; and
at least one elongated stop member arranged along at least the first conveyor and in alignment with the end surfaces of the spacer sticks when the spacer sticks are supported on the first and second conveyors whereby axial movement of the spacer sticks is prevented when the at least first conveyor is displaced laterally to its release position.

25. The apparatus as claimed in claim 24, wherein a hold down member is provided to prevent longitudinal displacement of the spacer sticks when at least one of the first and second conveyors are laterally displaced to its release position.

26. The apparatus as claimed in claim 24, wherein said at least one elongated member includes two elongated stop bars provided in connection with opposite end surfaces of the spacer sticks when the spacer sticks rest on the first and second conveyors, the stop bars being located, in the vertical direction, so as to permit passage, beneath the stop bars, of the conveyors when the conveyors are laterally displaced to their release positions, but to be hit by the end surfaces of the spacer sticks if one or more of the spacer sticks were to accompany such lateral movement.

27. The apparatus as claimed in claim 24, wherein an elongated slide rail is provided over the board stack and substantially in parallel with the first conveyor when in transport position, said slide rail being located vertically such that, when the second conveyor has been displaced to its release position and the second end portions of the spacer sticks originally supported on the second conveyor have fallen down onto the board stack, the first end portions of the spacer sticks are supported on the slide rail instead of on the first conveyor, said slide rail being laterally displaceable together with the first conveyor.

28. An apparatus for placing a selectable number of spacer sticks with selectable mutual distance on top of a board stack, the apparatus comprising:
a feeder device for individually feeding spacer sticks with selectable rate of feeding, the feeder device being located in association with an end of the board stack;
a conveyor device configured to receive the spacer sticks as fed by the feeder device and to transport the spacer sticks, with a selectable speed of transportation, to locations above their intended locations on top of the board stack; the conveyor device having at least one first and one second conveyor, the conveyors being located, in transport positions, above the board stack and along its opposed longitudinal sides for supporting opposite end positions of the spacer sticks, the first and second conveyors being laterally displaceable apart to release portions where the spacer sticks may pass between said first and second conveyors to their intended positions in top of the board stack.

29. The apparatus as claimed in claim 28, wherein a hold down member is provided to prevent longitudinal displacement of the spacer sticks when at least one of the first and second conveyors are laterally displaced to its release position.

30. The apparatus as claimed in claim 28, wherein two elongated stop bars are provided in connection with opposite end surfaces of the spacer sticks when the spacer sticks rest on the first and second conveyors, the stop bars being located, in the vertical direction, so as to permit passage, beneath the stop bars, of the conveyors when the conveyors are laterally displaced to their release positions, but to be hit by the end surfaces of the spacer sticks if one or more of the spacer sticks were to accompany such lateral movement.

31. The apparatus as claimed in claim 28, wherein an elongated slide rail is provided over the board stack and substantially in parallel with the first conveyor when in transport position, said slide rail being located vertically such that, when the second conveyor has been displaced to its release position and the second end portions of the spacer sticks originally supported on the second conveyor have fallen down onto the board stack, the first end portions of the spacer sticks are supported on the slide rail instead of on the first conveyor, said slide rail being laterally displaceable together with the first conveyor.

32. A method for placing a selectable number of spacer sticks with selectable mutual distances on top of a board stack having first and second longitudinal sides and first and second ends, the method comprising:

individually feeding spacer sticks with a selectable rate of feeding to a conveyor device, said spacer sticks being fed via a feeder device located in association with the first end of the board stack;

receiving said spacer sticks onto the conveyor device provided above the board stack and configured to receive the spacer sticks as fed by the feeder device, wherein the conveyor device has at least one first and one second conveyor, each having upper and lower runs, the first and second conveyors being, in transport positions, located above the board stack and along opposite longitudinal sides thereof for supporting, on their upper runs, opposite end portions of the spacer sticks;

transporting the spacer sticks with a selectable speed of transportation to locations above the spacer sticks intended locations on the board stack; and displacing the first and second conveyors laterally apart to release positions where the spacer sticks are free to pass downwardly between said first and second conveyors for placement at their intended positions on top of the board stack.

33. A method for placing spacer sticks on top of a board stack, comprising:

individually feeding spacer sticks to a conveyor device, said spacer sticks being fed via a feeder device located at an end of the board stack;

receiving said spacer sticks as fed by the feeder device onto the conveyor device;

transporting the spacer sticks to locations above the spacer sticks intended locations on top of the board stack, wherein the conveyor device has at least one first and one second conveyor, the conveyors being located, in transport positions, above the board stack and along its opposed longitudinal sides for supporting opposite end portions of the spacer sticks; and displacing the first and second conveyors laterally apart to release positions where the spacer sticks may pass between said first and second conveyors for placement of the spacer sticks at their intended positions on top of the board stack.

34. A method for placing spacer sticks on top of a board stack comprising:

individually feeding spacer sticks to a conveyor device, said spacer sticks being fed via a feeder device being located at an end of the board stack, wherein the conveyor device has at least one first and one second conveyor, the conveyors being located, in transport positions, above the board stack and along its opposed longitudinal side for supporting opposite end positions of the spacer sticks;

receiving said spacer sticks as fed by the feeder device onto the conveyor device;

transporting the spacer sticks to locations above the spacer sticks intended locations on top of the board stack;

displacing the first and second conveyors laterally apart to release positions where the spacer sticks may pass between said first and second conveyors for placement of said spacer sticks to their intended positions on top of the board stack; and preventing axial movement of the spacer sticks when the at least first conveyor is displaced laterally to its release position by way of at least one elongated stop member arranged along at least the first conveyor and in alignment with the end surfaces of the spacer sticks when the spacer sticks are supported on the first and second conveyors.

* * * * *